United States Patent
Xu et al.

(10) Patent No.: US 6,792,166 B1
(45) Date of Patent: Sep. 14, 2004

(54) LASER ASSISTED THERMAL POLING OF SILICA BASED WAVEGUIDES

(75) Inventors: Wei Xu, Gymea (AU); Danny Wong, Baulkham Hills (AU); Graham Town, Erskineville (AU); John Canning, Carlton (AU); Paul Blazkiewicz, Moorebank (AU)

(73) Assignee: The University of Sydney, Sydney (AU)

( * ) Notice: Subject to any disclaimer, the term of this patent is extended or adjusted under 35 U.S.C. 154(b) by 293 days.

(21) Appl. No.: 10/049,334
(22) PCT Filed: Sep. 14, 2000
(86) PCT No.: PCT/AU00/01115
§ 371 (c)(1), (2), (4) Date: May 30, 2002
(87) PCT Pub. No.: WO01/20389
PCT Pub. Date: Mar. 22, 2001

(30) Foreign Application Priority Data

Sep. 14, 1999 (AU) .............................. PQ2811

(51) Int. Cl.$^7$ .............................................. G02F 1/035
(52) U.S. Cl. .............................. 385/2; 385/12; 385/123; 385/142; 372/6
(58) Field of Search .......................... 385/1–4, 12, 142, 385/123–125; 372/6, 102

(56) References Cited

U.S. PATENT DOCUMENTS

| | | | |
|---|---|---|---|
| 4,964,262 A | 10/1990 | Moser et al. | 53/506 |
| 5,100,589 A | 3/1992 | Ticknor | 264/1.3 |
| 5,617,499 A | 4/1997 | Brueck et al. | 385/122 |
| 5,856,880 A | 1/1999 | Farina et al. | 359/43 |
| 6,436,857 B1 * | 8/2002 | Brueck et al. | 385/37 X |

FOREIGN PATENT DOCUMENTS

WO 9616344 5/1996

OTHER PUBLICATIONS

Derwent Abstract JP05241210–A dated Sep. 21, 1993 Accession No. 93–332148/42.
P. Blazkiewicz, et al. "Carbon dioxide laser–assisted poling of silicate–based optical fibers" *Optics Letters*, vol. 25, No. 4, p. 200–202, (2000).
M.V. Bergot, et al. "Generation of permanent optically induced second–order nonlinearities in optical fibers by poling" *Optics Letters*, vol. 13, No. 7, (1988).
Y. Quiquempois, et al. "Study of organized $x^{(2)}$ susceptibility in germanosilicate optical fibers" *Optical Materials* vol. 9, p. 361–367, (1998).
D. Wong, et al. "Positive and Negative Thermal Poling of Germanosilicate Fibers" *Technical Digest of OFC/IOOC'99*, ThG4, San Diego USA, p. 90–91, 94–95, (1999).
V. Prunerl, et al. "Electric–Field Thermally Poled Optical Fibers for Quasi–Phase–Matched Second–Harmonic Generation" *IEEE Photonics Technology Letters*, vol. 9, No. 2, (1997).

* cited by examiner

Primary Examiner—Phan T. H. Palmer
(74) Attorney, Agent, or Firm—Ladas & Parry LLP

(57) ABSTRACT

A method of thermally poling a silica based waveguide (12) comprises exposing a region of the waveguide (12) to an electric field (for example, via capillary electrodes (22, 24) inserted into holes in the waveguide); directing a laser beam (18) into the region exposed to the electric field to effect localized heating of the region via direct absorption; and scanning the laser beam (18) over the region at a rate selected to avoid heating of the region above the glass transition temperature. Reversing the electric field while scanning the laser beam (18) allows the formation of periodic poled gratings. The waveguide (12) can comprise an optical fiber.

12 Claims, 3 Drawing Sheets

LASER ASSISTED THERMAL POLING OF SILICA BASED WAVEGUIDES

FIELD OF THE INVENTION

The present invention relates broadly to a method and apparatus for thermal poling of materials and to devices incorporating poled materials.

BACKGROUND OF THE INVENTION

The induced variation of the electro-optic (EO) coefficient of materials (hereinafter referred to as poling) has been attempted e.g. for optical fibres and bulk glass to produce a residual EO coefficient chi(2) in the glass material.

Two main methods are presently applied for poling optical fibres or bulk glass: (I) thermal poling and (II) ultraviolet (UV) poling. The latter is believed to effect poling through non-thermal effects caused by UV absorption in the glass.

In both methods, a high poling voltage is applied across the material during either the heating process or the UV absorption to produce the EO coefficient changes.

The largest values of the EO coefficient in glass have been produced by UV poling. However, the resulting EO variations have been difficult to reproduce and the underlying principles are not fully understood, which makes this method unsuitable for mass-production of poled materials.

Thermal poling involves the heating of the entire bulk glass or optical fibre in an oven. However, this method has been typically limited to uniform poling. For non-uniform poling, periodic electrodes have to be deposited onto e.g. the bulk glass.

This has required the heating to be performed in a vacuum to prevent smearing between adjacent poling domains by reducing electrical conductivity in air between the electrodes. This results in a complex poling system and furthermore, the periodic poling design of e.g. poled gratings was limited by the photolithographic mask used for the deposition of the electrodes. Furthermore, as the sign of the EO coefficient can only be changed by applying a poling voltage of different polarity, this is practically impossible with such a poling system, since at the high voltages required, shortening between adjacent electrodes would occur.

SUMMARY OF THE INVENTION

A first aspect of the present invention provides a method of thermally poling a silica-based waveguide, comprising the steps of:

exposing a region of the waveguide to an electric field;
directing a laser beam into the region which is exposed to the electric field;
irradiating the region at a power density selected to effect localised heating of the waveguide within the region through direct absorption of the laser radiation; and
scanning the laser beam over the region.

The method may further comprise scanning the laser beam across the region to effect poling of the region.

The method may comprise varying the power density of the laser beam while scanning. Accordingly, a method of non-uniform thermal poling can be provided.

A direction of the electric field may be changed as the laser beam is scanned over the region. Accordingly, it can be possible to alternate the sign of the EO coefficient in non-uniform thermal poling.

Where the material comprises glass, the laser beam is preferably an infrared (IR) laser, for example a $CO_2$ laser.

Where the material is an optical fibre, wires may be inserted into tubular holes extending substantially parallel to a core of the optical fibre located between the tubular holes, and a differential voltage may be applied to the wires to create the electric field. The core of the optical fibre may comprise a germanosilicate material co-doped with phosphorous.

A second aspect of the present invention provides an apparatus for thermally poling a silica-based waveguide, comprising:

a means for exposing a region of the waveguide to an electric field;
a means for directing a laser beam into the region which is exposed to the electric field;
a means for irradiating the region at a power density selected to effect localised heating of the waveguide within the region through direct absorption of the laser radiation; and
a means for scanning the laser beam over the region.

A third aspect of the present invention provides an optical device incorporating a silica-based waveguide when thermally poled by the above-described method.

Preferred forms of the invention will now be described, by way of example only, with reference to the accompanying drawings.

DETAILED DESCRIPTION OF THE PREFERRED EMBODIMENTS

Figure 1:
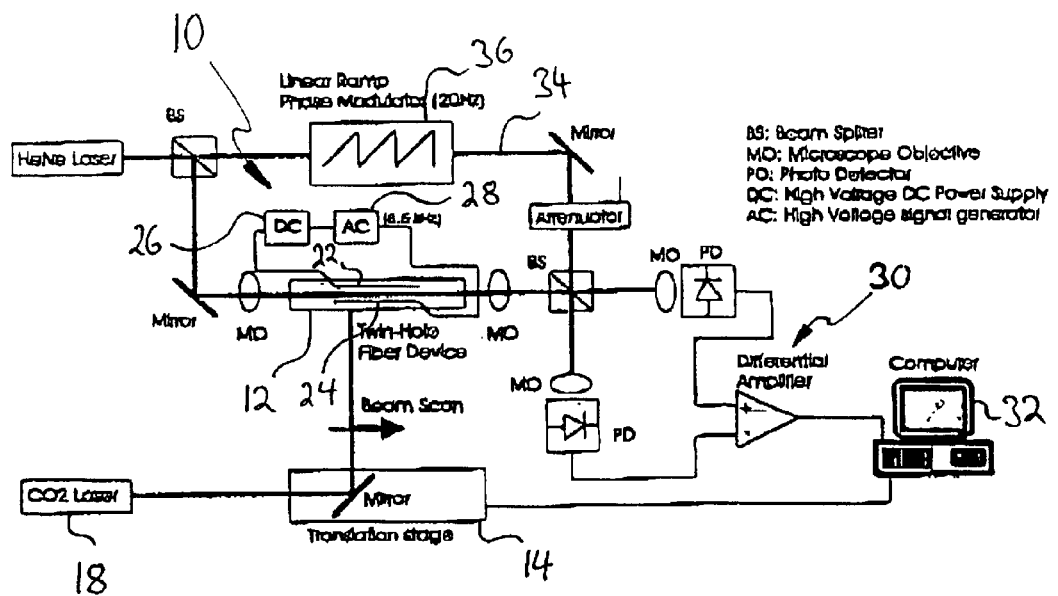
FIG. 1 shows a schematic drawing of an experimental set-up embodying the present invention.

In FIG. 1, a Mach-Zehnder interferometer 10 was used for in situ measurement of the evolution of the EO coefficient in an optical fibre 12. The optical fibre 12 is a twin hole fibre with a germano silicate core codoped with phosphorous. The hole diameter is 108 micrometer and the hole-to-hole spacing was 16 micrometer.

A translation stage 14 is used to scan a $CO_2$ laser beam from a $CO_2$ laser 18, using a mirror 20 to direct the laser beam 16 onto the fibre 12.

Aluminium wires 22, 24 were inserted via side entries (not shown) into each of the holes of the twin hole fibre 12 to provide electrodes for applying a poling voltage across the core of the optical fibre 12.

The wires 22, 24 were connected to a DC high voltage power supply 26. During the experiments, a poling voltage of 3.5 kW was applied.

A high voltage AC signal generator 28 is provided in series with the DC power supply 26. The high voltage AC signal generator 28 was utilised as a means to measure the EO coefficient of the core of the optical fibre 12 as follows.

Whilst the DC component of the high voltage acts as the poling voltage, the AC signal (8.5 kHz) can be used to effect refractive index changes in the core of the optical fibre due to the electro-optic effect. As the EO coefficient of the core of the optical fibre 12 changes, so does an AC component of the output of the Mach-Zehnder interferometer 10. The output of the Mach-Zehnder interferometer 10 is measured through a differential amplifier set-up 30 and analysed by a computer 32.

In the arm 34 of the Mach-Zehnder interferometer 10 which does not include the optical fibre 12 a linear ramp phase modulator 36 is used to get around thermal drift instabilities of the Mach-Zehnder interferometer during the experiment in a known manner.

The scan time for scanning the laser beam 16 along the approximately 7 cm of the optical fibre 12 was set at 55 seconds.

Figure 2:
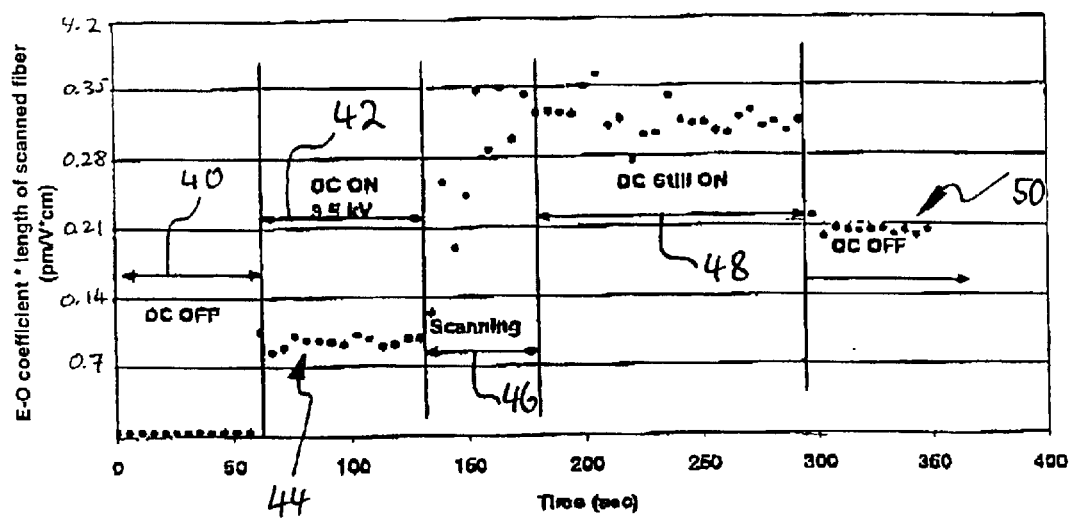
FIG. 2 shows a plot illustrating positive poling as a function of time embodying the present invention.

Turning now to FIG. 2, a typical EO evolution achieved during exposure of the fibre 12 (FIG. 1) with a positive applied high voltage. During a first period 40 when the DC high voltage and the laser beam are turned off, no EO effect is observable, which is characteristic for glass, which does not exhibit a measurable EO coefficient.

When the poling voltage is applied in the next segment 42, the EO coefficient jumps to a positive value (44). In the next segment 46 the laser beam is unblocked and the scan begins (whilst the poling voltage remains applied), and the quantity (EO coefficient*length of scanned fibre) grows rapidly during of the plot. In other words, the cumulative electrooptic phase shift caused by the fibre increases as the length of poled fibre increases during the scan.

When the scan ends and the laser beam is blocked again, the EO coefficient stops growing and remains substantially constant during the next segment 48, whilst the DC poling voltage remains applied.

Finally, upon turning the poling voltage off, a residual EO coefficient 50 remains, in the case illustrated in FIG. 2 the residual EO value 50 is approximately 2.03 pm/V.cm. At the end of the scan, the EO coefficient is the same at any point along the scanned region, i.e. 2.03 pm/V.cm divided by 7 cm (the scanned length)=0.29 pm/V.

(We note that during the entire measurement of the plot illustrated in FIG. 2, the AC signal remains being applied to measure the EO coefficient).

Figure 3:
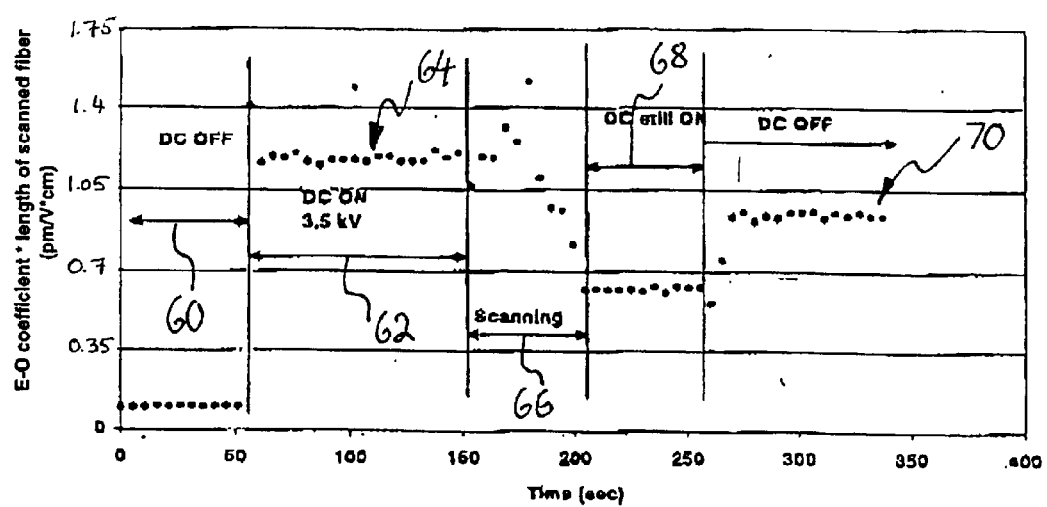
FIG. 3 shows a plot illustrating negative poling as a function of time embodying the present invention.

Turning now to FIG. 3, negative poling will now be described.

Again, initially when the poling voltage and the laser beam are turned off, only a noise level is measured in the first segment 60 of the plot shown in FIG. 3, as expected for glass.

In the next segment 62, when the DC poling voltage is turned on, the EO coefficient jumps to a substantially constant value 64, we note that the sign of the EO coefficient is opposite to the EO coefficients in FIG. 2 due to a poling voltage of different polarity being applied during the negative poling experiment.

In the next segment 66 of the plot shown in FIG. 3, the laser beam is unblocked and the scan begins, the quantity (EO coefficient*length of scanned fibre) decays but remains non-zero.

When the scan ends and the beam is blocked, the EO coefficient stops decaying and maintains substantially constant whilst the poling voltage is still applied during segment 68 of the plot shown in FIG. 3.

Finally, when the poling voltage is turned off, a residual (negative) EO coefficient 70 remains, in this case −0.91 pm/V.cm.

Applications

Non-uniformly poled waveguides such as optical fibres can be used for the fabrication of quasi-phase-matched (QPM) optical devices. The phase matching condition can be satisfied by choosing the correct period for a periodic poled grating.

QPM can be realised in glass and optical fibres using the present invention by for example varying the polarity of the applied poling voltage between different regions that are being poled.

Quasi-Phase-Matched gratings can be used for optical frequency mixing and optical switches.

The efficiency of frequency conversion is dependent on the amplitude of the EO coefficient variations in the gratings over the poled length of a waveguide. This has limited the application of poled gratings for frequency conversion, since the EO coefficient variations are typically small, especially in thermal poling.

However, with the present invention, the efficiency of the frequency conversion can be increased because it is now possible to produce poled gratings that are for example metres long, thereby in its cumulative effect overcoming the deficiency problem.

With the method of the present invention, relatively high EO coefficients have been poled in relatively short times compared to thermal poling, which typically requires a time of 10 minutes at 280° C. with a 3.5 kV poling voltage to achieve EO coefficients of 0.15 to 0.2 pm/V, i.e. smaller than the EO coefficients achieved with the present invention within 55 seconds.

This can enable rapid poling of optical fibres for commercial manufacture, where for example the $CO_2$ laser is used to rapidly heat up silicate glass while a poling voltage is applied across the glass as described above.

Furthermore, if a twin-hole optic fibre with electrode wires already in the holes is drawn this enables poling of optical fibres either before or during the drawing of the fibre whilst applying a voltage across the two embedded electrode wires. This could allow very long lengths of poled optical fibre to be produced.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The claims defining the invention are:

1. An apparatus for thermally poling a silica-based waveguide, comprising:
    a means for exposing a region of the waveguide to an electric field;
    a means for directing a laser beam into the region which is exposed to the electric field;
    a means for irradiating the region at a power density selected to effect localized heating of the waveguide within the region through direct absorption of the laser radiation; and
    a means for scanning the laser beam over the region.

2. A method of thermally poling a silica-based waveguide, comprising the steps of:
    exposing a region of the waveguide to an electric field;
    directing a laser beam into the region which is exposed to the electric field;
    irradiating the region at a power density selected to effect localized heating of the waveguide within the region through direct absorption of the laser radiation; and
    scanning the laser beam over the region.

3. A method as claimed in claim 1 wherein a direction of th electric field is changed as the laser beam is scanned over the region.

4. A method as claimed in claim 3, wherein the direction of the electric field is reversed as the laser beam is scanned over the region.

5. A method as claimed in claim 1 wherein the electric field and/or laser are controlled to effect a non-uniformly poled structure in the region.

6. A method as claimed in claim 5 wherein the electric field and/or laser are controlled to effect a periodic poled structre.

7. A method as claimed in claim 1 when applied to a waveguide in the form of an optical fibre.

8. A method as claimed in claim 7, when applied to an optical fibre in which the core comprises germanosilicate co-doped with phosphorous.

9. A method as claimed in claim 7, wherein wires are inserted into tubular holes extending substantially parallel to a core of the optical fibre located between the tubular holes, and a differential voltage is applied to the wires to create the electric field.

10. A method as claimed in claim 1 wherein the laser is controlled to such that the power density of the laser beam is varied while scanning.

11. A method as claimed in claim 1 wherein the laser beam is an IR laser beam.

12. An optical device incorporating a silica-based waveguide when thermally poled by the method as claimed in claim 1.

* * * * *